United States Patent [19]

Thurnauer

[11] 4,150,907
[45] Apr. 24, 1979

[54] STANCHION CONNECTOR ASSEMBLY

[75] Inventor: William Thurnauer, Teaneck, N.J.

[73] Assignee: Julius Blum & Co., Inc., Carlstadt, N.J.

[21] Appl. No.: 884,648

[22] Filed: Mar. 8, 1978

[51] Int. Cl.² .............................................. F16B 7/08
[52] U.S. Cl. .................................. 403/234; 403/191; 256/67; 256/69
[58] Field of Search ........................ 256/69, 67, 68, 65; 403/233, 234, 235, 237, 191, 187, 189, 116, 123, 56; 285/185, 191

[56] References Cited

U.S. PATENT DOCUMENTS

| 288,319 | 11/1883 | Edsall | 403/56 |
| 370,774 | 10/1887 | Fuller | 403/123 X |
| 1,110,183 | 9/1914 | Bonham | 256/65 |
| 1,772,159 | 8/1930 | Roth | 256/65 |

FOREIGN PATENT DOCUMENTS

| 584560 | 2/1925 | France | 256/67 |

Primary Examiner—Andrew V. Kundrat
Attorney, Agent, or Firm—Arthur B. Colvin

[57] ABSTRACT

The present invention relates to a stanchion connector assembly adapted to provide an anchor for the terminal end of a ramp rail whereby the same may be secured to a stanchion at any of a series of relative angles with respect thereto.

2 Claims, 3 Drawing Figures

U.S. Patent    Apr. 24, 1979    4,150,907
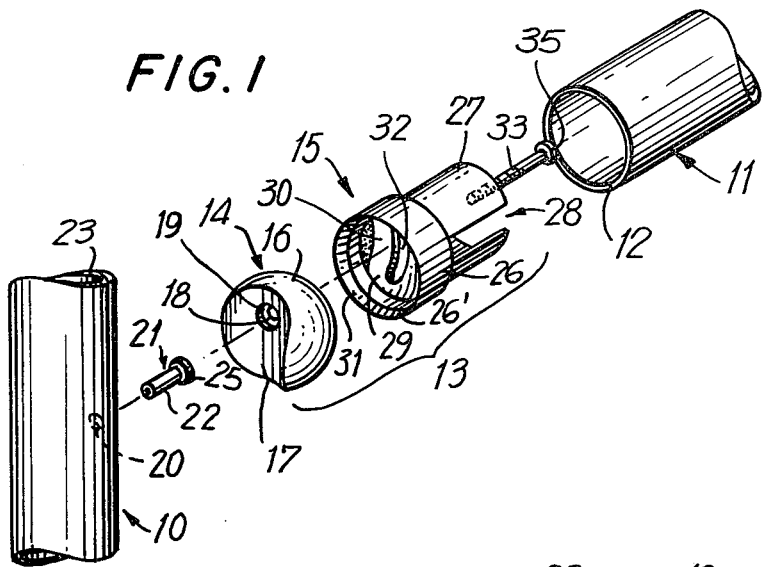
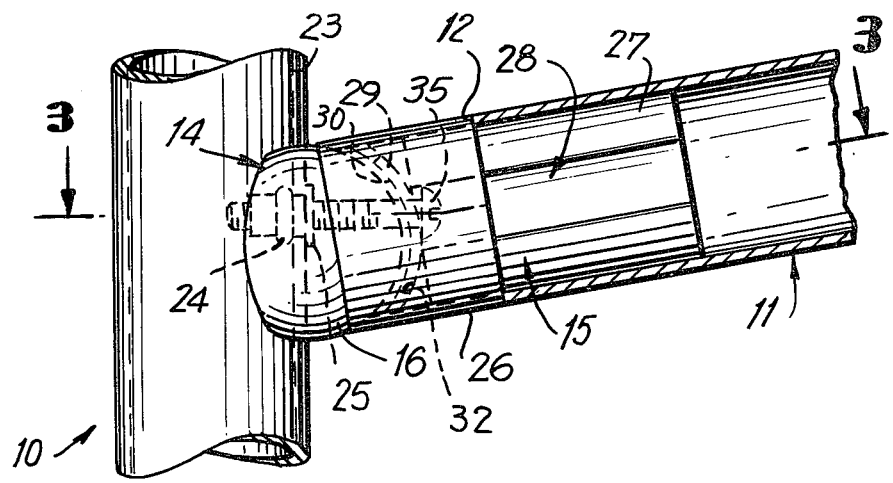
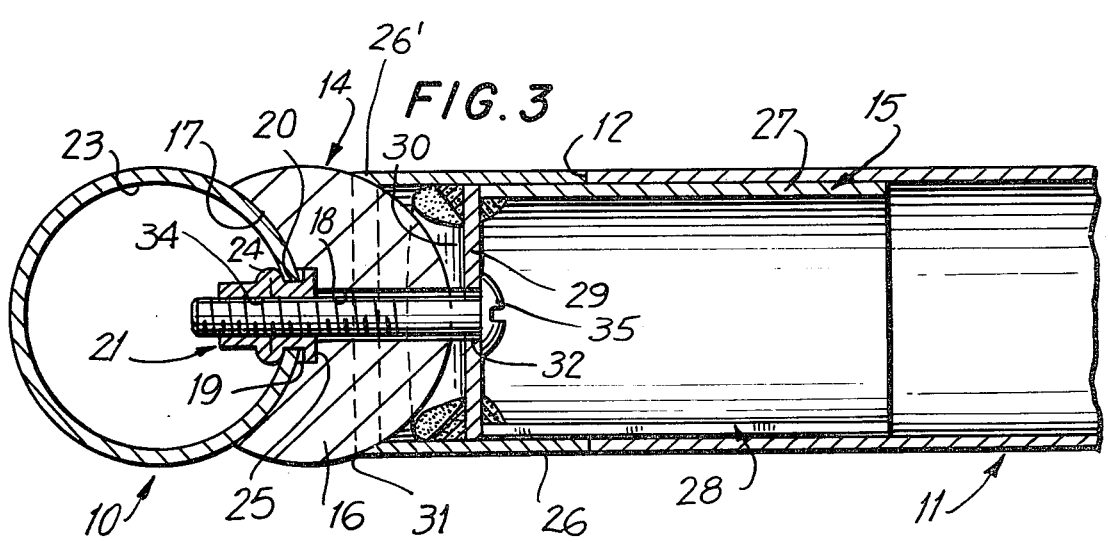

STANCHION CONNECTOR ASSEMBLY

BACKGROUND OF THE INVENTION

1. Field of the Invention

The present invention pertains to the field of construction assemblies generally, and specifically to the field of railing assemblies of the type in which the butt end of horizontally or angularly inclined rails are affixed to vertically directed stanchions or posts as to define a railway adjacent a ramp, flight of stairs or the like.

2. The Prior Art

As conducive to an understanding of the present invention, it will be recognized as conventional to provide adjacent platforms, ramps, stairways and like enviromental situations, a boundary system comprised of a rail or rails secured to posts or stanchions typically extending vertically adjacent the area to be bounded.

In particular, substantial attention is today directed to the creation of so-called ramp rail systems for use in public buildings and the like, especially and particularly to accommodate the handicapped, such as persons confined to wheel chairs. As will be readily recognized, such ramp systems are not conducive to the use of standard fixtures since the inclination and length of the ramp must be varied in the field to accommodate the particular situation.

Where the rail systems are horizontally directed and the stanchions are vertical, any of a number of bracket connector assemblies may be suitably employed for fastening a rail span to the spaced stanchions. However, where the rail is to be used adjacent a stairway, ramp or like inclined construction, and especially where a butt end connection between an inclined railing and stanchion must be effected, bracket assemblies heretofore employed have suffered one or more significant drawbacks.

By way of example, although it is conventional to field-measure proposed railing constructions and factory fabricate brackets and bracket connections in accordance with the field measurements, it frequently occurs that the measurements and bracket assemblies do not jibe, with the result that on-the-job adjustments must be effected. Often such on-the-job adjustments create an unsightly condition at the junction and/or fail to provide the desired effective mechanical connection.

As examples of rail connector systems heretofore known embodying the difficulties hereinafter set forth, there may be mentioned the following U.S. Pat. Nos. 3,207,479 and 3,239,196.

SUMMARY OF THE INVENTION

The present invention may be summarized as directed to a connector assembly adapted to secure the end portion of a rail, and particularly but not necessarily a cylindrical rail member, to butt end engagement with a vertically directed stanchion member, and particularly a cylindrical tubular stanchion section.

More particularly, the invention provides a butt end connection between the aforesaid components while permitting a wide diversity of angular relationship between the noted components, at the same time presenting an attractive appearance at the interface.

In accordance with the invention, the connector comprises a receiver portion adapted to be securely mounted to a stanchion at any of a variety of positions therealong. The connector includes a first or fixed component arranged to be secured to the stanchion, the fixed component including an arcuate front face adapted to be clamped against the outer face of the stanchion and a parti-spherical rear face projecting beyond the stanchion. The second or movable component includes a surrounding collar having a concave, parti-spherical or arcuate clamp plate interiorly fixed thereof, said concave surface including an arcuate slot formed therethrough. A rail retaining shank portion extends axially outwardly beyond the collar.

The device is utilized by first anchoring an internally threaded stud member to the stanchion. Thereafter a bolt member is passed through the slot of the movable component and through an aperture defined in the fixed component, the bolt being threadedly engaged with the stud and tightened into position.

By virtue of the interfit of the fixed and movable components, the angular relation of the collar to the stanchion may be varied within a relatively wide range. The angular relationship of the parts is fixed by tightening of the bolt, which functions to draw the inner end surface of the collar of the movable component against the convex spherical surface of the rear face of the component and also to secure the arcuate surface of the fixed component against the stanchion.

A rail member is seated over the shank portion of the movable component, whereby the retaining mechanism previously mentioned is concealed.

Accordingly, it is an object of the invention to provide a connector mechanism adapted to define a butt joint connection between a rail member and a stanchion.

A further object of the invention is the provision of a butt joint connector of the type described especially adapted for use in securing a rail to a stanchion at an adjustable angle relative thereto.

A further object of the invention is the provision of a connector assembly of the type described wherein the parts may be fixedly secured by a single bolt mechanism which both supports the members to the stanchion and also affords a degree of angular adjustability between the components.

A further object of the invention is the provision of a device of the class described which is inexpensive to manufacture and install and which provides a highly desirable, aesthetically pleasing finished appearance, without exposed fasteners.

To attain these objects and such further objects as may appear herein or be hereinafter pointed out, reference is made to the accompanying drawings, forming a part hereof, in which:

FIG. 1 is an exploded perspective view of the connector assembly interposed between a stanchion and the end portion of a rail member to be connected to the stanchion;

FIG. 2 is a side elevational view of a finished connection, parts being shown in section;

FIG. 3 is a slightly magnified section taken on the discontinuous section line 3—3 of FIG. 2.

Referring now to the drawings, there is shown a stanchion member 10 which, in accordance with the preferred embodiment, is comprised of a vertically disposed hollow cylindrical pipe, the lower end of which (not shown) may be sunk in concrete or otherwise supported as in a bracket fixed to a boundary area adjacent a ramp, stairway or the like. A rail member 11, having an end portion 12, is intended to be mounted to the stanchion in a butt joint connected relation.

It is desired to provide a fitting which will accommodate the connection between the rail 11 and stanchion 10 in any of a number of desired angular relationships and it is to this end that the fitting assembly 13 of the present invention is directed.

The connector member includes a fixed component 14 adapted to be mounted to the stanchion 10 and a movable component 15. The fixed component 14 includes a parti-spherical outer portion 16, an arcuate inner portion 17 and an aperture 18, which aperture is disposed radially relative to the parti-spherical surface as well as normal to the arcuate surface 17. The aperture 18 is surrounded by an enlarged diameter countersink portion 19.

For purposes of mounting the fixed component 14, there is formed in the stanchion 10 a receiver aperture 20. In order to afford a connection to the stanchion 10, a conventional blind rivet member 21 is secured in the aperture 20, as shown in FIGS. 2 and 3. To this end, the rivet 21 is emplaced by sleeving the initial narrow shank 22 through the aperture 20 and thereafter upsetting portions of the shank inwardly adjacent the internal wall 23 of the stanchion.

The procedures for setting the blind rivet 21 are well known and conventional and, generally speaking, involve tightening a threaded member extending through the rivet to draw the collapsible inner end of the rivet outwardly thus producing an outward folding of the material in the area 24, which may be slotted, whereby the head member 25 of the blind rivet is securely clamped against the outer surface of the stanchion 23 and the enlargement 24 is securely clamped against the interior surface of the stanchion.

The movable component 15 of the connector member includes a cylindrical collar 26 having an outwardly directed split shank portion 27 incorporating an axially extending slot 28.

The collar 26 includes an internal clamp plate 29 which is secured within the collar, as by welding. Clamp plate 29 incorporates a forwardly facing, concave surface 30 which may be arcuate or parti-spherical, said surface having a radius of curvature matching the radius of curvature of the surface 16 of the fixed component 14. Preferably, the end 26' of the collar 26 incorporates on its inner surface an annular bevel portion 31 which will, after installation, by tightly pressed against the partispherical surface 16 of the fixed member. The clamp plate 29 includes an arcuate slot 32.

The connector assembly 13 is secured to the previously positioned blind rivet 21 by locking bolt 33. The bolt is passed inwardly through slot 32 in the clamp plate, through the axial aperture 18 of the fixed component 16, and into the threaded interior bore 34 of the rivet 21.

It will be appreciated that by virtue of the mating but slightly spaced parti-spherical surface 16 of the fixed member and concave surface 29 of the movable member, a degree of tilting of the member 15 relative to the member 14 may be achieved and that the components may be locked in their adjustably tilted position by tightening of the bolt 33. In practice and without limitation, a relative tiltability of about 30° from horizontal provides sufficient adjustability for most installations.

In the locked position, the head portion 25 of the blind rivet fits within the enlarged counter-sink portion 19 surrounding the aperture 18 of the fixed component 16.

It will be further apparent that the tightening of the bolt may be readily effected before positioning of the railing section 11 since the head 35 of the bolt is readily accessible.

Once the bolt is tightened, the fixed and movable parts 14, 15 are locked together at a predetermined angular relationship and are thereafter no longer free to pivot or tilt relative to each other.

After the adjustment of the connector member is completed, the railing member 11 is slid over the shank 27. Insertion of the railing end may be facilitated by applying a radial inward force to the shank, which may be readily inwardly deflected by virtue of the slot 28. Optionally, in order to assure against the rail separating from the shank, cement may be added at the interface of the noted parts.

The outer diameter of the rail 11 is preferably equal to the outer diameter of the collar 26 whereby, after positioning of the parts, the appearance of a break or discontinuity between the rail and collar is minimized. Optionally, the outer surfaces of the collar and rail may be ribbed, grooved or otherwise variegated, further lending the effect of a continuous piece.

From the foregoing it will be appreciated that the described connector assembly provides a facile means for securing the terminal end of a rail to a stanchion, while at the same time enabling a substantial amount of angular adjustment to be effected between the noted parts in the course of installation.

Assembly of the rail to the stanchion is a simple operation as only a single mounting bolt or connector need be secured to the stanchion to effectuate the desired coupling of the parts.

The nature of the clamped connection afforded is such that both vertical and lateral forces exerted on the rail are absorbed essentially by the interfit of the parts, the principal forces exerted on the bolt being of a tensile nature, notwithstanding the forces exerted on the rail.

As will be readily recognized from the foregoing, the formation of a butt end connection may be effected in the field by suitably cutting the rail length, mounting the connector member and positioning the rail, eliminating, to a large degree, the necessity for field measurements and corresponding factory to-order fabrication.

While the device has been described as utilizing the stanchion as the anchor point for the connector, it will be readily recognized that the threaded connection may be effected to the rail, and the shank portion 27 sleeved into the uppermost end of the stanchion. Such utilization is most frequently encountered in the connection of the top rail to the uppermost ends of spaced stanchions.

It will be further understood that skilled workers in the art, conversant with the instant disclosure, may devise variations and modifications thereof without departing from the spirit of the invention. Accordingly, the invention is to be broadly construed within the scope of the appended claims.

Having thus described the invention and illustrated its use, what is claimed as new and is desired to be secured by Letters Patent is:

1. A connector assembly for effecting a butt joint connection between a tubular fixed stanchion member and a rail member comprising, in combination, a fixed connector component including an arcuate inner face adapted to mate with the outer surface of said stanchion, a parti-spherical outer face and a bore extending through from said inner to said outer face, said bore being disposed in a substantially radial direction with respect to the curves of said inner and outer faces, a movable connector component adapted to be clampingly engaged against said outer face of said fixed component, said movable component including an inwardly directed cylindrical collar having an end portion, the inner surface of said end portion of said collar having an outwardly directed annular bevel, the radius of curvature of said collar being less than the radius of curvature of said outer face of said fixed component, a concave clamp plate spaced outwardly of said cylindrical collar and fixedly connected thereto, said clamp plate including an arcuate surface having substantially the same radius of curvature as said outer surface of said fixed component, an arcuate slot formed in said clamp plate, a rail receiver shank fixed to said collar and extending in a direction opposite the direction of concavity of said clamp plate, said shank being adapted to receive and rigidly support said rail member thereon, and a bolt member extending through said slot of said clamp plate and said aperture of said fixed component and threadedly engaging a portion of said stanchion, thereby clampingly to engage said inner face of said fixed member against said stanchion and said end portion of said collar against said outer surface of said fixed member, the angular orientation of said fixed and movable members being variable within the limits provided by said arcuate slot.

2. A connector assembly in accordance with claim 1 wherein said receiver shank includes an axially directed slot portion enabling the same to be radially contracted.

* * * * *